United States Patent [19]

Smith

[11] 4,342,177
[45] Aug. 3, 1982

[54] PREFABRICATED STEEL FRAME BUILDING CONSTRUCTION COMPONENTS AND METHODS

[76] Inventor: Donald A. Smith, 7514-27th NE., Seattle, Wash. 98115

[21] Appl. No.: 49,624

[22] Filed: Jun. 18, 1979

[51] Int. Cl.³ .......................... E04B 7/02; F16B 7/08
[52] U.S. Cl. ......................................... 52/93; 52/281;
52/665; 52/741; 403/188; 403/313; 403/387; 403/400
[58] Field of Search ..................... 52/93, 90, 657, 665, 52/714, 281, 741; 403/171, 172, 176, 188, 189, 310, 313, 387, 400

[56] References Cited

U.S. PATENT DOCUMENTS

| | | | |
|---|---|---|---|
| 649,352 | 5/1900 | Rector | 52/93 |
| 1,036,439 | 8/1912 | Brown | 52/657 |
| 1,885,330 | 11/1932 | Cherdron et al. | 52/93 X |
| 1,989,811 | 2/1935 | Kulp et al. | 52/714 X |
| 2,632,533 | 3/1953 | MacKenzie | |
| 2,653,553 | 9/1953 | Jacobs | 52/639 X |
| 2,815,831 | 12/1957 | Hield et al. | 52/93 |
| 2,871,997 | 2/1959 | Simpson et al. | 52/93 |
| 2,989,154 | 6/1961 | Colby, Jr. | 52/93 |
| 3,019,861 | 2/1962 | Rasch et al. | 52/639 |
| 3,137,098 | 6/1964 | Elia et al. | |
| 3,157,251 | 11/1964 | Rasch | 52/93 |
| 3,184,012 | 5/1965 | Fujishima et al. | 52/90 |
| 3,191,238 | 6/1965 | Olson | 52/93 X |
| 3,309,120 | 3/1967 | Wada | 52/93 X |
| 3,331,180 | 7/1967 | Vissing et al. | 52/714 |
| 3,414,300 | 12/1968 | Spane | 52/93 |
| 3,425,720 | 2/1969 | Spane | 52/93 X |
| 4,106,257 | 8/1978 | Gilb | 52/714 X |

FOREIGN PATENT DOCUMENTS

| | | | |
|---|---|---|---|
| 134977 | 10/1949 | Australia | 403/400 |
| 798181 | 3/1936 | France | 52/90 |
| 2354422 | 1/1978 | France | 52/90 |
| 765688 | 1/1957 | United Kingdom | 52/90 |
| 770901 | 3/1957 | United Kingdom | 52/93 |
| 803074 | 10/1958 | United Kingdom | 52/90 |

OTHER PUBLICATIONS

Varco-Pruden, Inc., Product Manual 10/68, pp. EW-1, EW-3, GD-9, BD-2, BD-3, BD-6, BD-7.
Kirby Building Systems Product Manual 4/74, pp. M7-3, M7-5, M7-6.
Butler (Loose Leaf Catalogue) drawing No. 105852-00, 4/75, Drwg. No. 105772-00.
Curaco Products Manual, pp. S4, P5.

Primary Examiner—Alfred C. Perham
Attorney, Agent, or Firm—Gregory W. Moravan; Roy E. Mattern, Jr.; David H. Deits

[57] ABSTRACT

A prefabricated steel frame building structural system which is assembled with nuts and bolts and required no shop welding or site fabrication. The columns and beams in the building are fabricated from lengths of very high strength, light gauge, stiffened C-channel steel stock. Uniquely designed haunch plates and haunch plate stiffener angles are used for column-beam connections and novel ridge plates and ridge plate stiffener angles are used for beam-beam connections to form the two hinged end wall and intermediate frames for the building. Also used are novel corner girt clips for securing the girts to the corner columns; rake purlin angles for securing purlins to the rake beams; and purlin girt clips for securing purlins to the intermediate beams and for securing girts to the intermediate columns. Each of the mentioned components are designed so that they may be used interchangeably at both the left and right sides of the building, there being no specially designed left and right said components. Also disclosed are unique methods of fabricating the purlin girt clips; and of designing a prefabricated steel frame building whose size may be incrementally varied while using the same said components, except for the length and/or gauge of the columns and beams, regardless of the dimensions of the building within a given range of building sizes.

24 Claims, 23 Drawing Figures

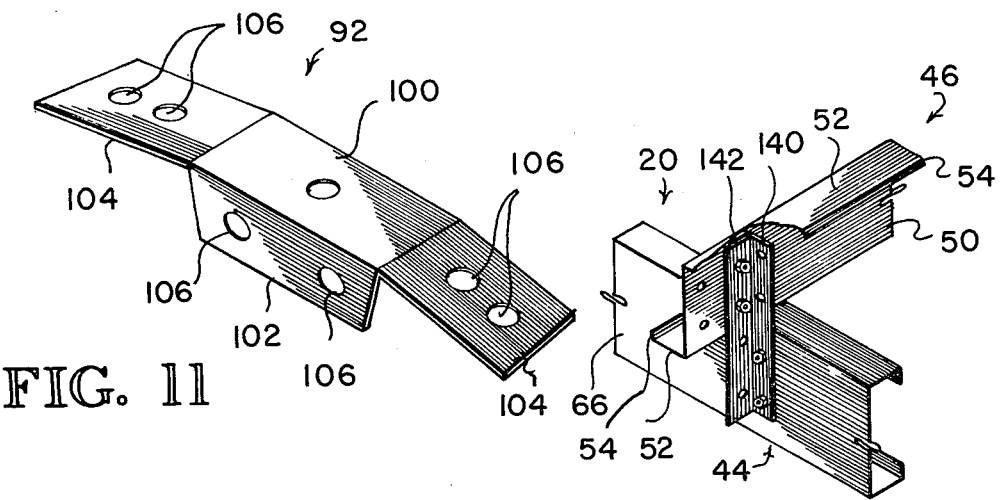
FIG. 11
FIG. 14
FIG. 12
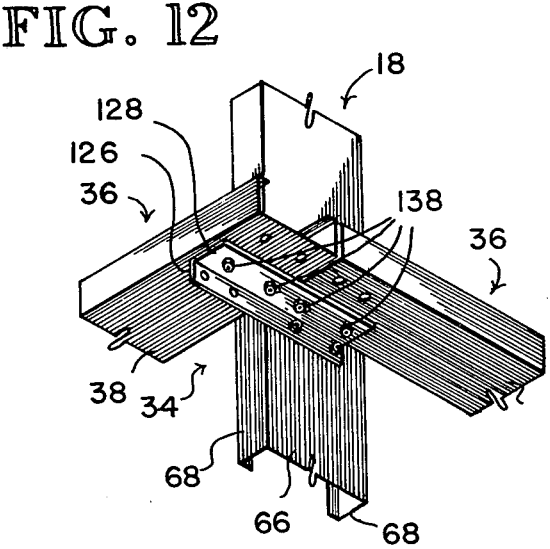
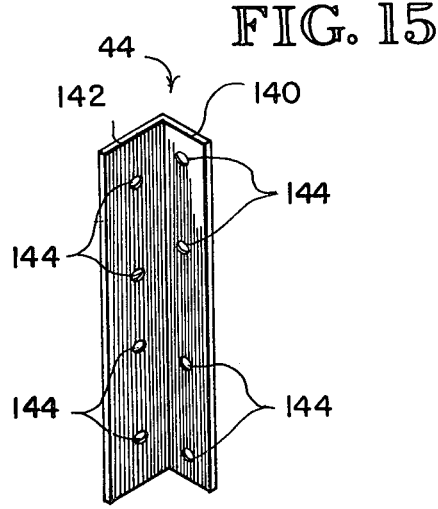
FIG. 15
FIG. 13
FIG. 16
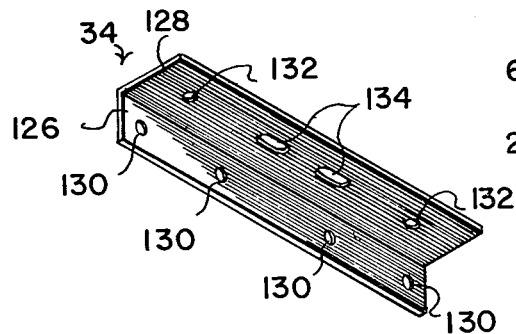
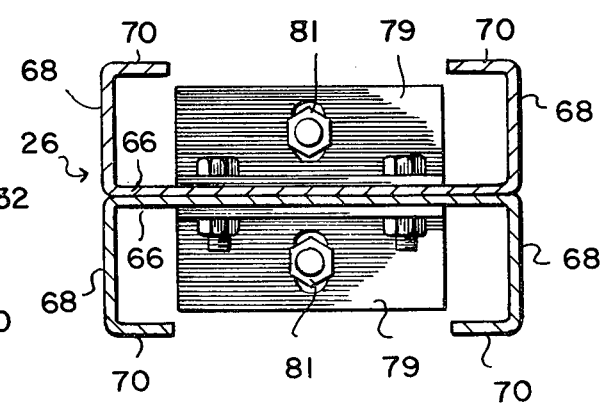

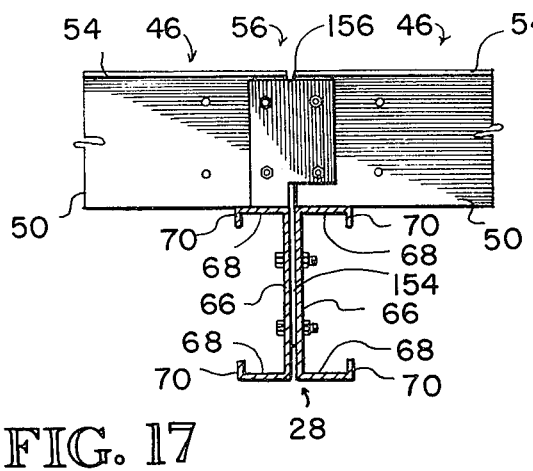
FIG. 17
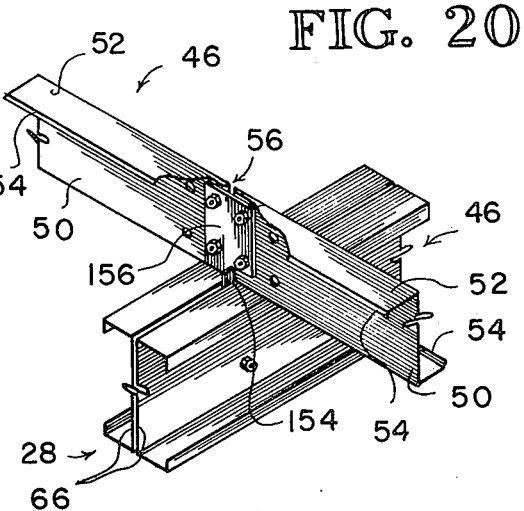
FIG. 20
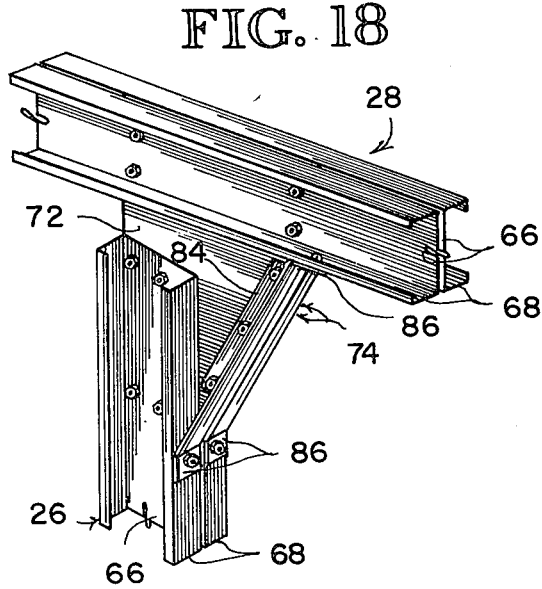
FIG. 18
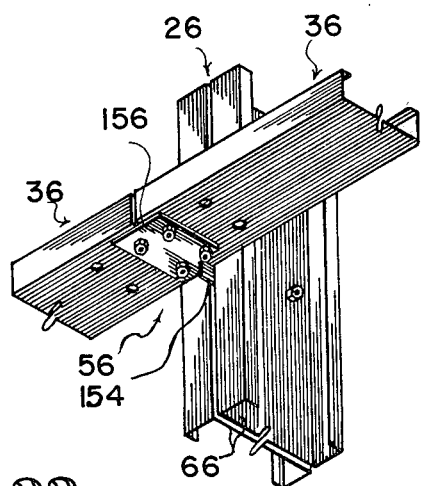
FIG. 21
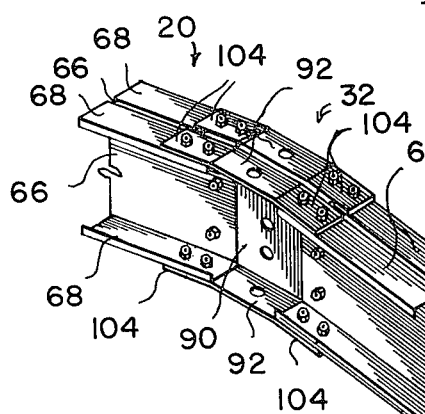
FIG. 19
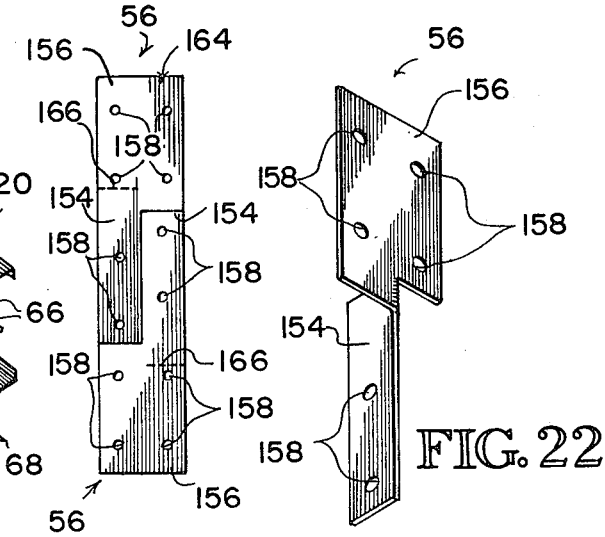
FIG. 23
FIG. 22

PREFABRICATED STEEL FRAME BUILDING CONSTRUCTION COMPONENTS AND METHODS

BACKGROUND OF THE INVENTION

There has long existed a need for a prefabricated steel frame building structural system which can be assembled on the job site with nuts and bolts by a non-trained but mechanically inclined layman. The present invention discloses such a structural system which, in addition, requires no on site fabrication or welding, and which minimizes the number of parts necessary by making all components in the frames usable interchangeably on the left and right sides of each frame.

One of the primary objects of the present invention is to provide such a structural system which utilizes non-tapered lengths of high tensile strength, light gauge, stiffened C-channel steel stock to form the columns and beams in the frames of the building. The purpose for using such non-tapered steel stock in the columns and beams is twofold.

Firstly, it avoids the use of costly, custom designed tapered columns and/or beams typically found in steel frame buildings. This is achieved through the use of uniquely designed haunch and ridge assemblies for the column-beam and beam-beam connections which permit the use of non-tapered columns and beams according to the present invention.

Secondly, it enables the design of a structural system for a steel frame building whose height and/or width can be simply and incrementally varied, while the stress design of most of the structural components comprising the frames remains unchanged. This is achieved through designing the haunch and ridge assemblies to withstand the stress imposed by the most adverse conditions, namely a building having the smallest height and greatest width contemplated for a given range of building sizes. Hence, haunch and ridge assemblies so designed can be safely utilized for all other sizes of buildings within that range, as the height of any particular building is increased and/or its width decreased, since the loading on these assemblies decreases as the building's height is increased and/or its width is decreased within that range. Accordingly, recalling that the columns and beams are non-tapered, the only changes in the frames which are necessitated by an increase in building height and/or a decrease of building width within said range would then simply be a change in the length and/or a change in the gauge of the said steel stock used in the columns and beams in the frames. As will be appreciated, the manufacturing and inventorying of components for the frames of any building within said range is vastly reduced, resulting in major cost savings.

Another object of the present invention is to provide unique haunch and ridge assemblies which will safely and economically connect, reinforce, stiffen and transfer stress between the columns and beams and between adjacent beams, respectively, and which permit the use of non-tapered columns and beams in the frames.

A further object of the present invention is to provide haunch plates which can be used interchangeably in the left and right haunches of any frame and which can be used interchangeably in the end wall and intermediate frames, to connect, reinforce and transfer stress between their respective columns and beams.

Similarly, another object of the present invention is to provide haunch plate stiffener angles which can be used interchangeably as were the haunch plates above; and which can also be used interchangeably on both sides of the left and right haunch plates in the intermediate frames where a pair of haunch plate stiffener angles are attached to opposite sides of each left and right haunch plate. In addition, each haunch plate stiffener angle stiffens and reinforces its respective haunch plate; connects, reinforces, and transfers stress between its respective column and beam; and splices and transfers loading between the flanges of its column and beam. Each haunch plate stiffener angle can be used interchangeably because it is symmetrical about a line passing transversely through the center thereof.

A further object is to provide ridge plates which connect, reinforce, and transfer stress between their respective beams, and which can also be used interchangeably in the end wall and intermediate frames.

Another object is to provide ridge plate stiffener angles which stiffen and reinforce their respective ridge plates, and which splice and transfer stress between the flanges of their respective beams. In addition, the ridge plate stiffener angles according to the present invention can be used interchangeably in the end wall and intermediate frames, and can be used interchangeably at the top and bottom and on both sides of the ridge plates. The interchangeable nature of the ridge plate stiffener angles is achieved through their being symmetrical about a transverse line passing through the center thereof, and by the ingenious arrangement and manner of attaching each ridge plate stiffener angle to the flanges of its respective beams.

A further object of providing rake purlin angles which can be used interchangeably at the left and right sides of the end wall frames is achieved through their being symmetrical about a line passing transversely through the center thereof.

Another object of the present invention is to provide symmetrical purlin girt clips which can be used interchangeably on the left and right sides of the intermediate frames and columns due to their symmetrical nature, and which also support their respective purlins or girts during the assembly process to eliminate the need for one man to hold the purlins or girts in place while another man secures them to their respective purlin girt clips. In addition, it is an object to provide a method of making such purlin girt clips which eliminates the need for any welding during their fabrication, in order to reduce their cost.

An additional object of the present invention is to provide corner girt clips which, due to their being symmetrical about a line passing transversely through the center thereof, and due to their novel use of slotted fastening holes, can be used interchangeably at the left and right columns of the end wall frames despite the non-uniform pattern of holes which are punched in the ends of most commercially available girts.

Another object of the present invention is to provide a method for providing the framing for a steel frame building whose height and/or width can be incrementally varied within a given range without the necessity of redesigning the loading design of the haunch and ridge assemblies, and requiring at most a change in the length and/or gauge of the columns and beams used in each frame.

A further object is to provide said haunch plates, haunch plate stiffener angles, ridge plates, ridge plate stiffener angles, corner girt clips, rake purlin angles, and purlin girt clips which are assembled to their related components with nuts and bolts, rather than by being welded thereto.

Another object is to provide intermediate frames for a prefabricated, assemblable steel frame building in which the columns and beams are made from lengths of said steel stock having their webs bolted together, rather than being welded.

The foregoing description of certain objects and features of the present invention is by no means to be considered exhaustive, since these and further objects, features, advantages and characteristics will be disclosed by the following, more detailed, description of the preferred embodiments of the present invention.

BRIEF DESCRIPTION OF THE FIGURES

FIG. 11 is a perspective view of a ridge plate stiffener angle;

FIG. 12 is a detailed, perspective view showing a corner girt clip assembled to its end wall column and having an end wall girt and a side wall girt assembled to it;

FIG. 13 is a perspective view of a corner girt clip;

FIG. 14 is a detailed, perspective view showing a rake purlin angle bolted to an end wall beam and showing the end of a purlin bolted to the rake purlin angle;

FIG. 15 is a perspective view of a rake purlin angle;

FIG. 16 is a cross-sectional view of a column taken along line 16—16 of FIG. 1;

FIG. 17 is a cross-sectional view of a beam taken along line 17—17 of FIG. 1;

FIG. 18 is a detailed perspective view of an intermediate frame of the building showing a haunch plate and two haunch plate stiffener angles assembled to a column and a beam;

FIG. 19 is a perspective view of the ridge portion of an intermediate frame showing two beams connected by ridge plate stiffener angles and a ridge plate;

FIG. 20 is a detailed, perspective view showing a purlin girt clip connected to a beam and showing two purlins connected to the purlin girt clip;

FIG. 21 is a detailed, perspective view of a purlin girt clip connected to a column and showing two girts connected to the purlin girt clip;

FIG. 22 is a perspective view of a purlin girt clip; and

FIG. 23 is an elevational view of a steel plate showing thereon in outline two purlin girt clips.

DESCRIPTION OF THE PREFERRED EMBODIMENTS

Figure 1:
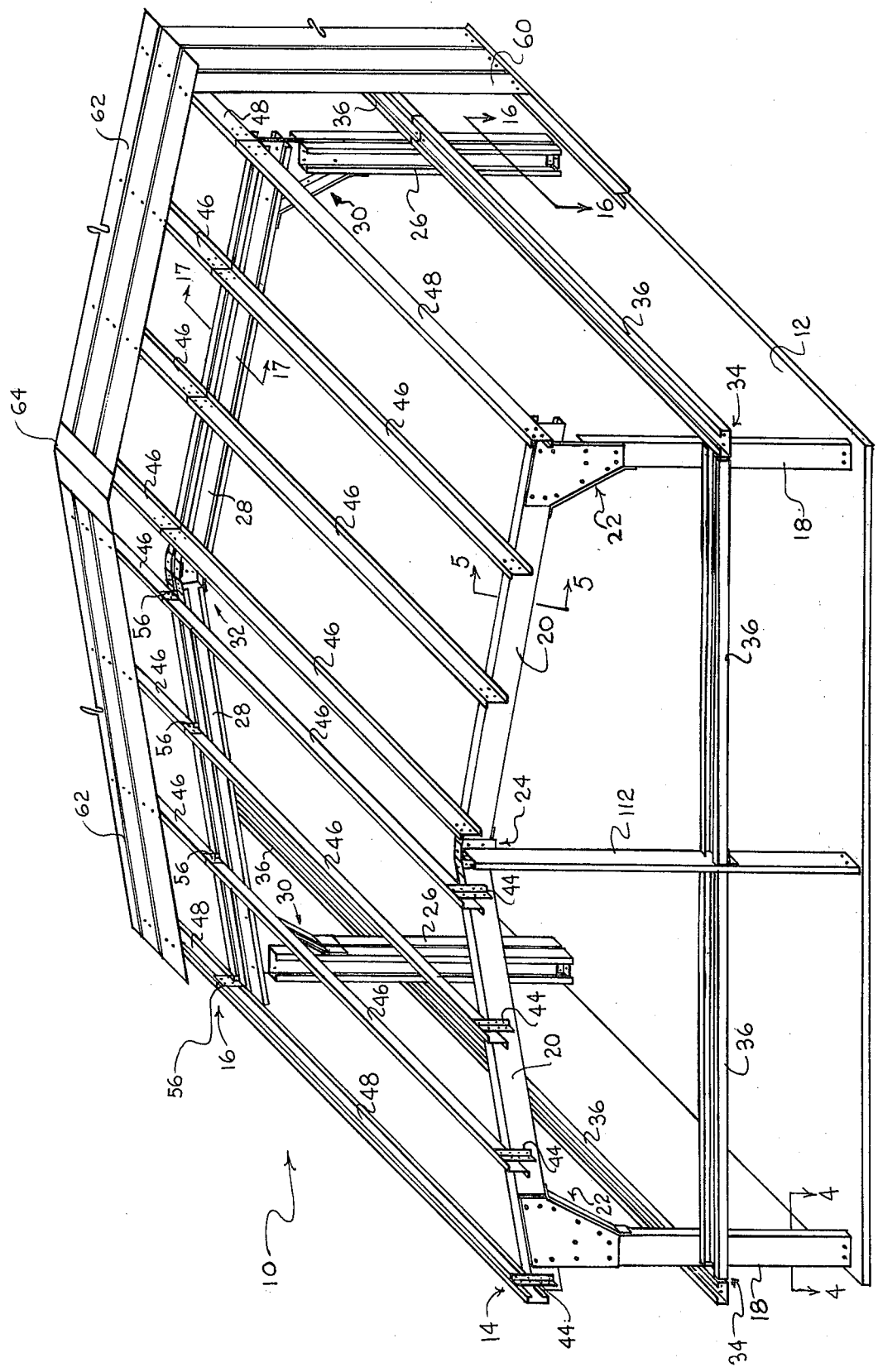
FIG. 1 is a perspective view of one end portion of a steel frame building according to the present invention.

Referring now to FIG. 1, there is shown a steel frame building 10 which is assembled with nuts and bolts from prefabricated components, rather than being assembled by welding the prefabricated components together. The building 10 is constructed on a foundation such as a concrete pad 12, of conventional construction, and includes a pair of spaced apart end wall frames 14 between which are located a plurality of intermediate frames 16. Of course, it is to be understood that the number of frames 16 is dictated by the desired length of the building 10, and when the building end walls 14 are close enough together frames 16 are not required if the purlins 46 which span from one end wall 14 to the opposite end wall 14 are strong enough to independently carry the stress imposed on them.

Each end wall frame 14 comprises left and right end wall columns 18 connected to left and right end wall beams 20 by left and right end wall haunch connecting and reinforcing assemblies 22. The ridge ends of the beams 20 are connected by an end wall ridge connecting and reinforcing assembly 24. Similarly, each intermediate frame 16 comprises left and right intermediate columns 26 connected to left and right intermediate beams 28 by left and right intermediate haunch connecting and reinforcing assemblies 30. The ridge ends of the beams 28 are connected by an intermediate ridge connecting and reinforcing assembly 32. As will be explained in more detail subsequently, the assemblies 22, 24, 30 and 32 connect, stiffen, reinforce, and transfer loading between their respective columns 18, 26 and beams 20, 28.

Figure 2:
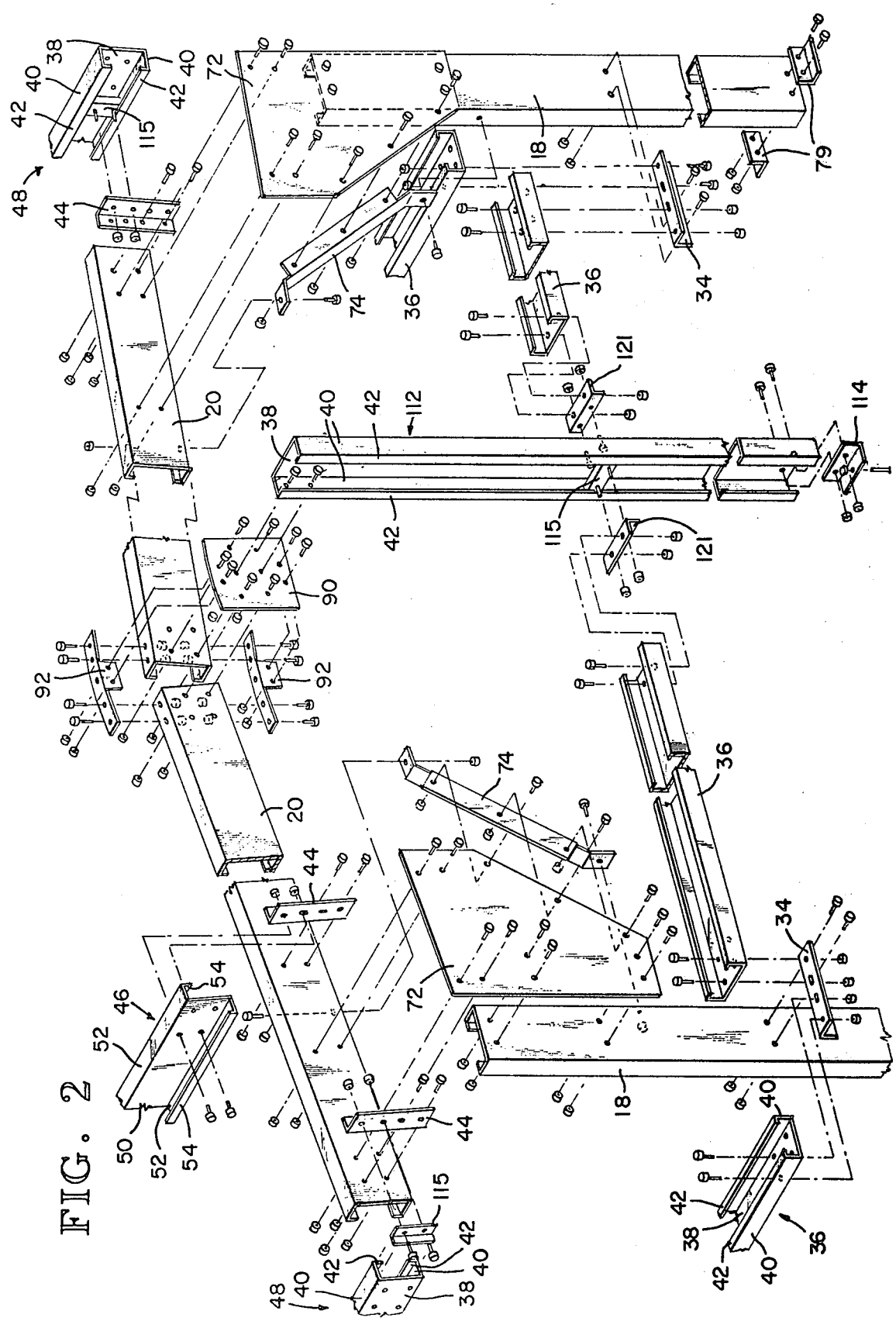
FIG. 2 is an exploded, perspective view of an end wall frame.
Figure 3:
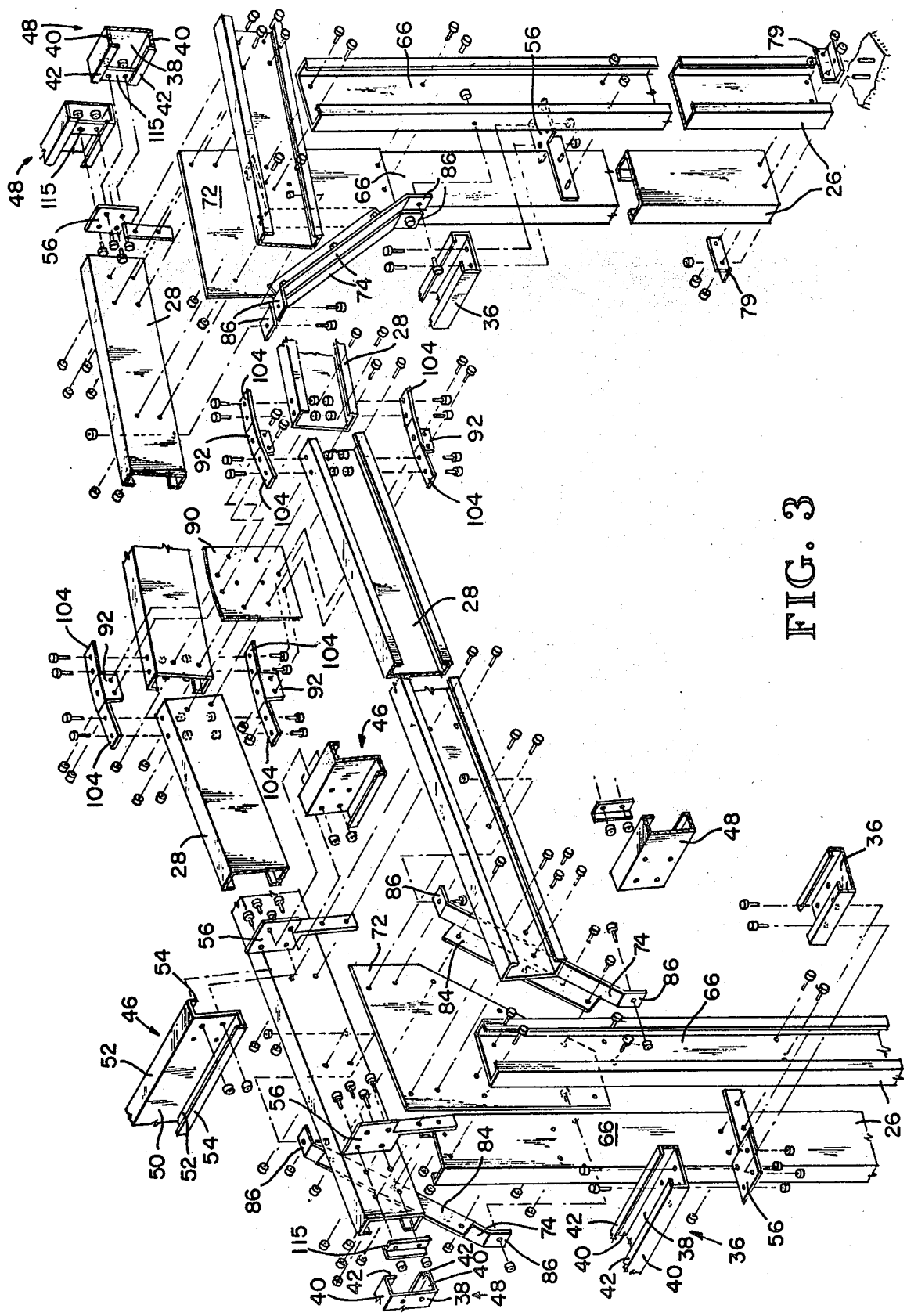
FIG. 3 is an exploded, perspective view of an intermediate frame.

A plurality of corner girt clips 34 are used to secure the ends of the girts 36 to the end wall columns 18. Although only one level of girts 36 is illustrated in FIG. 1, more levels of girts 36 may be needed if the height of the building 10 were greater than that illustrated. The number of levels of girts 36 needed will be dictated by conventional sound structural engineering criteria. As best seen in FIGS. 2 and 3, each girt 36 preferably comprises a length of non-tapered, high strength, light gauge steel stock, having a web 38, flanges 40 at right angles to the web 38 and a pair of lips 42 at right angles to the flanges 40.

A plurality of rake purlin angles 44 are used to secure the end wall ends of the purlins 46 and of the eave girts 48 to the end wall beams 20. The eave girts 48 are identical to the girts 36, having webs 38, flanges 40 and lips 42. As best seen in FIGS. 2 and 3, each purlin 46 is of generally Z-shaped cross-section, and has a web 50, a pair of flanges 52 on opposite sides of the web 50 and at right angles with respect to the web 50, and a pair of lips 54 at about a 135 degree interior angle with respect to the flanges 52.

Referring again to FIG. 1, a plurality of purlin girt clips 56 are used to secure the adjacent ends of the purlins 46 and of the eave girts 48 to their respective intermediate frames 16. A plurality of purlin girt clips 56 are also used to secure the adjacent ends of girts 36 to their respective intermediate frames 16. A plurality of tie rods, not illustrated, are secured by any conventional means between various members of the building 10 to aid its structural integrity. The number and location of the tie rods is determined by conventional, sound structural engineering criteria.

Siding 60, such as sheets of corrugated steel for example, is secured to the girts 36 and eave girts 48 by any conventional fastener to form the exterior walls of the building 10. Roofing 62, which may also be sheets of corrugated steel, for example, is secured to the purlins 46 and eave girts 48 by any conventional fastener to form the roof to the building 10. A ridge cap 64 prevents leakage at the ridge line of the building 10.

Naturally, as many windows, man doors, and doors for vehicles can be built into the building 10 as desired, by using any conventional construction for these components.

Figure 4:
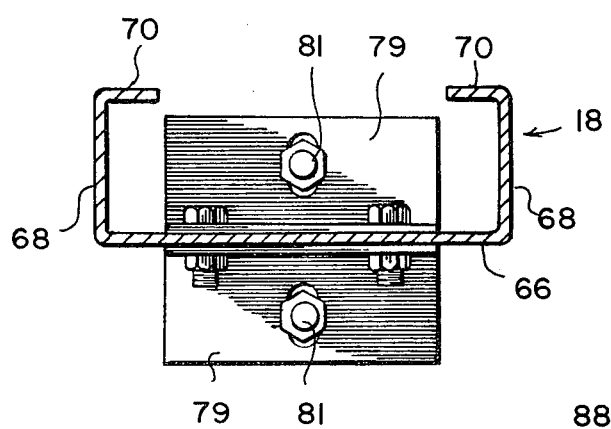
FIG. 4 is a cross-sectional view taken along line 4—4 of FIG. 1.
Figure 5:
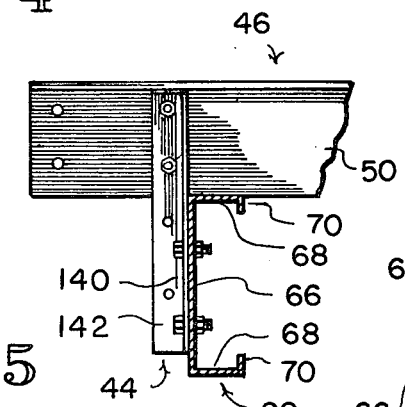
FIG. 5 is a cross-sectional view taken along line 5—5 of FIG. 1.

Referring now to FIGS. 1 and 2, consideration will be given to the detailed construction of the end wall frames 14. Naturally, each end wall frame 14 is identical, except where noted below. Each end wall column 18 and each end wall beam 20 comprises a single length of high strength, light gauge, nontapered, stiffened, C-channel steel stock. As best seen in FIGS. 4 and 5, respectively, each length of said steel stock used to make the end wall columns 18 and end wall beams 20 has a web 66, a pair of flanges 68 at right angles to the web 66, and a pair of lips 70 at right angles to the flanges 68.

Figure 6:
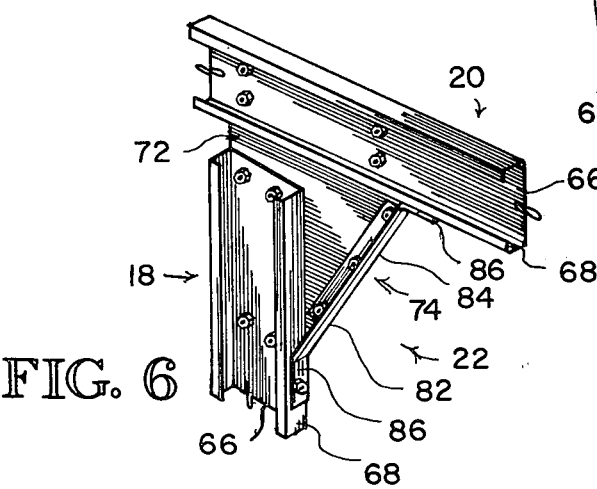
FIG. 6 is a detailed, perspective view of a haunch plate and a haunch stiffener angle shown assembled to an end wall column and an end wall beam, the view being taken from the inside of the building.
Figure 10:
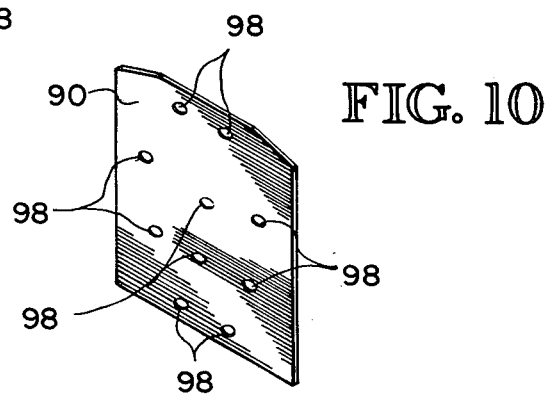
FIG. 10 is a perspective view of a ridge plate.
Figure 7:
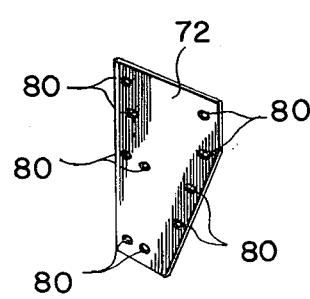
FIG. 7 is a perspective view of a haunch plate.

Turning again to FIGS. 1, 2 and 6, it is seen that the left and the right end wall haunch assemblies 22 are of similar construction and each assembly 22 comprises a haunch plate 72 having a haunch plate stiffener angle 74 secured thereto with a plurality of nuts and bolts. Referring to FIGS. 2 and 7, each haunch plate 72 is identical, is cut or stamped from a steel plate, has a plurality of fastener holes 80, and serves to connect, reinforce, and transfer loading between its respective column 18 and beam 20. It is noted that any particular haunch plate 72 can be used at either the left or the right side of the end wall frame 14.

Figure 8:
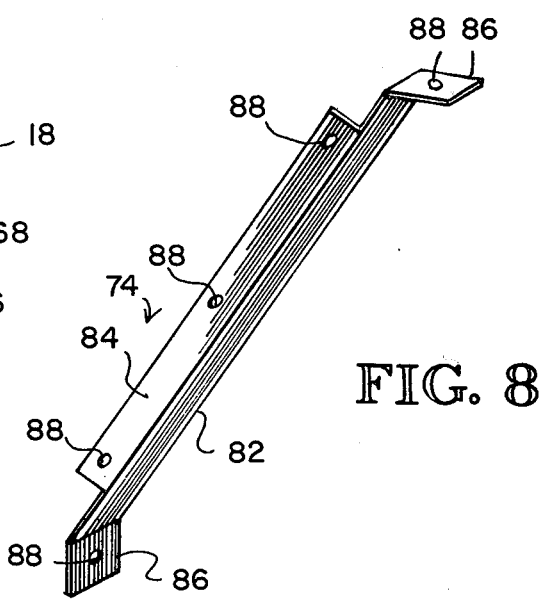
FIG. 8 is a perspective view of a haunch plate stiffener angle.

Turning now to FIGS. 2 and 8, it is seen that each haunch plate stiffener angle 74 is identical, having its first side 82 at right angles to its second side 84. The first side 82 has a pair of extensions 86 which extend beyond the ends of the second side 84, each extension 86 being disposed at an angle with respect to the first side 82. The first side 82, second side 84, and the extensions 86 define a plurality of fastener holes 88. An important part of the present invention is that each stiffener angle 74 is symmetrical about a line passing transversely through the center thereof, enabling any particular stiffener angle 74 to be used with either the left or the right end wall haunch plate 72. Each stiffener angle is formed by stamping it from a steel plate, bending its sides 82, 84 at right angles and bending its extensions 86 at angles with respect to its first side 82.

Each stiffener angle 74 serves to stiffen and reinforce its respective haunch plate 72 and also serves to connect, stiffen, reinforce, and transfer loading between its respective column 18 and beam 20. In particular, its extensions 86 serve to splice together and transfer loading between their respective interior flanges 68 of the columns 18 and beams 20. The points of intersection of its extensions 86 with their respective column 18 and beam 20, as well as the angle that its first side 82 makes with respect to its respective column 18 are determined by sound structural engineering criteria.

A plurality of nuts and bolts are used to secure each haunch plate 72 to the webs 66 of its respective column 18 and beam 20, and are also used to secure the extensions 86 of the haunch plate stiffener angles 74 to their respective interior flanges 68 of the columns 18 and beams 20.

As perhaps best seen in FIG. 4, the base of each end wall column 18 is secured to the concrete pad 12 by the use of a pair of column base angles 79 which are secured to anchor bolts 81 in the pad 12 and which are secured to the column 18 with nuts and bolts.

Figure 9:
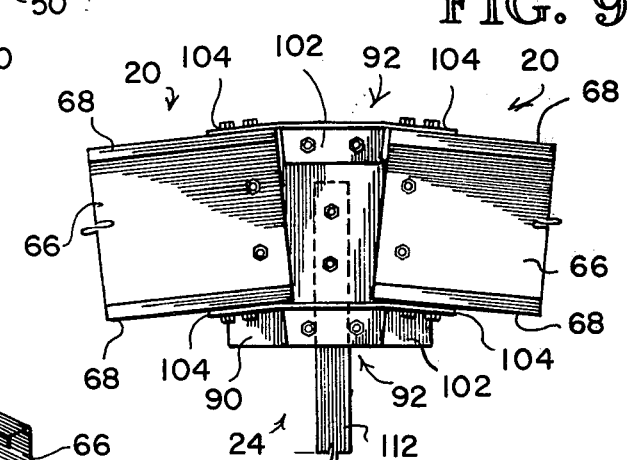
FIG. 9 is a detailed, elevational view of a ridge plate and a pair of ridge plate stiffener angles shown assembled to their end wall beams, the view being taken from inside the building.

Referring to FIGS. 1, 2 and 9, it is seen that each end wall ridge assembly 24 comprises a ridge plate 90 having a pair of identical ridge plate stiffener angles 92 secured thereto with a plurality of nuts and bolts. Each ridge plate 90 is cut or stamped from a steel plate and, as seen in FIGS. 2 and 9, has a plurality of fastener holes 98. The ridge plate 90 serves to connect, reinforce, and transfer loading between its respective beams 20.

Turning now to FIGS. 2 and 11, a ridge plate stiffener angle 92 is shown having its first side 100 at right angles to its second side 102. The first side 100 has a pair of extensions 104 which extend beyond the ends of the second side 102, the extensions 104 each being disposed at an angle with respect to the first side 100. The first side 100, the second side 102, and the extensions 104 define a plurality of fastener holes 106. Each stiffener angle 92 is formed by stamping it from a steel plate, bending its sides 100, 102 at right angles, and bending its extensions 104 at angles with respect to its first side 100.

An important feature of the present invention is that it has been discovered that any particular ridge plate stiffener angle 92 made according to the present invention can be used at either the top or the bottom of the ridge plate 90. This is made possible by sizing the ridge plate 90 and stiffener angles 92 as shown, by orienting the stiffener angles 92 as shown, by securing the extensions 104 of the upper stiffener angle 90 to the upper surfaces of the beams' exterior flanges 68, and by securing the extensions 104 of the lower stiffener angle 90 to the lower surfaces of the beams' interior flanges 68.

Each stiffener angle 92 serves to stiffen and reinforce its respective ridge plate 90 and also serves to connect, stiffen, reinforce, and transfer loading between its respective beams 20. Further, its extensions 104 serve to splice together and transfer loading between their respective flanges 68 of the beams 20.

A plurality of nuts and bolts are used to secure the ridge plate 90 to the webs 66 of its respective beams 20, and are also used to secure the extensions 104 of the stiffener angles 92 to their respective interior and exterior flanges 68 of the beams 20.

Referring to FIGS. 1 and 2, although structurally not strictly required, an end wall center column 112 may be used to both provide additional support for the end wall frame 14, but primarily to provide a mounting location to support the girts 36 at the center of the end wall frame 14. The lower end of the column 112 is secured to the concrete pad 12 by a column base angle 114 in the same way that the lower ends of the end wall columns 18 were secured to the pad 12. The upper end of the column 112 is secured to the end wall ridge plate 90 by a pair of nuts and bolts.

The center column 112 is of the same construction as a girt 36, having a web 38, flanges 40 and lips 42. As has been mentioned, although not illustrated, man doors and vehicle doors may be provided in the conventional manner in an end wall frame 14. If a centrally located door is required in an end wall frame 14, a pair of spaced apart columns 112 may be provided instead of the single, centrally located column 112 illustrated.

As has been mentioned, a plurality of corner girt clips 34 are used to secure the girts 36 to the end wall columns 18. As best seen in FIGS. 2, 12, and 13, each corner girt clip has a first side 126 at right angles to its second side 128. Its first side includes a plurality of circular mounting holes 130, while its second side includes a pair of both circular and elongated mounting holes 132, 134, respectively. Each corner girt clip 34 is symmetrical about a line passing transversely through its center, enabling any particular clip 34 to be used at either the left or the right end wall columns 18. Preferably each clip 34 is stamped from a steel plate, after which its sides 126, 128 are bent at right angles to each other.

A plurality of nuts and bolts secure the first sides 126 of the corner girt clips to their respective columns 18 and their second sides 128 to the webs 38 of their respective girts 36. As will be apparent from an inspection of the figures, one circular hole 132 and one elongated hole 134 are used in securing any girt 36 to its respective corner girt clip 34. Also to be noted is that once the corner girt clips 34 are assembled to their respective columns 18, the girts 36 may simply be rested on the clips' second sides 128 while the girts are assembled thereto, thereby eliminating the need for a second person to hold each girt in place while it is assembled to its respective clip 34, resulting in considerable savings in labor.

As seen in FIG. 2, once one end of each girt 36 spanning the end wall frame 14 is secured to its corner girt clip 34, the other end of each girt 36 is secured to the center column 112. Since the lips 42 of the column 112 face left, a girt clip holder 115 is inserted behind the lips 42 and secured with a plurality of nuts and bolts to girt clip 121. Another girt clip 121 is then secured with a plurality of nuts and bolts to the web 38 of the column 112. Then the ends of the girts 36 located adjacent the column 112 are secured with a plurality of nuts and bolts to their respective girt clips 121.

As has been mentioned, a plurality of rake purlin angles 44 are used to secure the purlins 46 and the eave girts 48 to the end wall beams 20. As best seen in FIGS. 2, 14 and 15, each angle 44 has first and second sides 140, 142 respectively, at right angles to each other. Its first and second sides have a plurality of mounting holes 144. Each angle 44 is symmetrical about a line passing transversely through its center, and is preferably formed by being stamped from a steel plate, after which its sides 140, 142 are bent at right angles to each other. It is important to note that said angle 44's symmetry permits the use of any particular angle 44 with either the left or the right end wall beam 20.

A plurality of nuts and bolts are used to secure the first side 140 of each rake purlin angle 44 to its respective beam 20, as well as to secure the web 50 of its respective purlin 46 to its second side 142.

As seen in FIGS. 2 and 14 the width and length of the first side 140 of each angle 44 are chosen to enable said angle 44 to nest within the upper flange 52 and the upper lip 54 of its respective purlin 46. As will be appreciated, this nesting feature will hold each purlin in place while it is being secured to its respective rake purlin angle 44 despite the pitch of the roof. This makes it possible for one man working alone to assemble the purlins 46 to their respective angles 44, a considerable savings in labor since a second man is not needed to hold the purlins 46 in place during this operation.

Referring again to FIG. 2, although a rake purlin angle 44 is also used to secure each eave girt 48 to its respective end wall beam 20, a slightly different approach must be taken since it is the lips 42 rather than the web 38 of the eave girt which are secured to the angle 44. Accordingly, a girt clip holder 115, as shown, is inserted behind the lips 42 enabling the nuts and bolts to engage the holder 152, and hence to firmly secure the eave girt to its angle 44.

Now that a description of the end wall frames 14 has been given, a description of the intermediate frames 16 will now be undertaken. It should be noted that all the frames 16 are identical and that many of the components forming the frames 16 are identical to those forming the frames 14. Accordingly, for clarity, the same reference numerals will be used for those components which are used in both the frames 14 and 16.

Referring to FIGS. 1 and 3, it is recalled that each intermediate frame 16 comprises a pair of columns 26, a pair of haunch assemblies 30, a pair of beams 28 and a ridge assembly 32. As seen in FIGS. 16 and 17, each intermediate column 26 and beam 28 comprises a pair of lengths of high strength, light gauge, nontapered, stiffened, C-channel steel stock, each length having a web 66, a pair of flanges 68 at right angles to the web 66, and a pair of lips 70 at right angles to the flanges 68. The webs 66 of each pair of said lengths of steel stock are secured adjacent each other.

Referring now to FIGS. 1, 3, and 18, it is seen that the left and right intermediate haunch assemblies 30 each comprise a haunch plate 72 and a pair of haunch plate stiffener angles 74 secured to opposite sides thereof. It is particularly noted that all haunch plates 72 and all haunch plate stiffener angles 74 are identical and can be used interchangeably in both the left and right haunch assemblies 22, 30 in both the end wall frames 14 and intermediate frames 16 to serve the same purposes. Further, because of the symmetrical nature of each stiffener angle 74, any angle 74 can be used on either side of any haunch plate 72 in an intermediate frame.

As seen, the second sides 84 of a pair of stiffener angles 74 are secured with a plurality of nuts and bolts to opposite sides of each left and right haunch plate 72. A plurality of nuts and bolts are used to secure each haunch plate 72 between the webs 66 of each pair of lengths of said steel stock comprising its respective column 26 and beam 28, and are also used to secure the extensions 86 of its respective pair of haunch plate stiffener angles 74 to their respective interior flanges 68 of said respective column 26 and beam 28.

As best seen in FIG. 16, the base of each intermediate column 26 is secured to a pair of anchor bolts 81 in the concrete pad 12 with a pair of column base angles 79, nuts and bolts.

Referring to FIGS. 1, 3 and 19, it is seen that any intermediate ridge assembly 32 comprises a ridge plate 90 having two pairs of ridge plate stiffener angles 92 secured to opposite sides thereof. It is particularly noted that all ridge plates 90 and all ridge plate stiffener angles 92 are identical and can be used interchangeably in any end wall or intermediate ridge assembly 24, 32 to serve the same purposes. Further, due to the symmetrical nature of the stiffener angles 92, any particular stiffener angle 92 can be used at the top or the bottom of either side of any intermediate ridge plate 90.

As seen, a plurality of nuts and bolts are used to secure the two pairs of the stiffener angles 92 to opposite sides of their respective intermediate ridge plate 90. A plurality of nuts and bolts are used to secure the intermediate ridge plate 90 to the webs 66 of its respective beams 20, and are also used to secure the extensions 104 of the stiffener angles 92 to their respective interior and exterior flanges 68 of the beams 20.

As has been mentioned, a plurality of purlin girt clips 56 are used to secure the purlins 46 and eave girts 48 to the intermediate beams 28 and are also used to secure the girts 36 to the intermediate columns 26. Turning now to FIG. 22, each purlin girt clip 56 has a first side 154 at transverse right angles with respect to its second side 156, with its first side 154 meeting its second side 156 in the central portion of its second side 156. Both its first and second sides 154, 156 include a plurality of fastener holes 158. In use, as seen in FIGS. 17, 20, and 21, its first side 154 is sandwiched between the webs 66 of its respective column 26 or beam 28 and is secured in place with a plurality of nuts and bolts. A plurality of nuts and bolts are similarly used to secure the adjacent ends of its two respective purlins 26, eave girts 48 or girts 36 to its second side 156. Referring to FIG. 3, as was the case with connecting the eave girts 48 to the rake purlin angles 44, a girt clip holder 115 is inserted behind the lips 42 of the eave girts 48 prior to their connection to their respective purlin girt clips 56.

Referring now to FIG. 23, preferably each purlin girt clip 56 is stamped from a steel plate 164 with adjacent clips 56 being located on the steel plate 164 as shown in order to minimize any wastage of material. Next, each clip 56 is cut along dotted line 166 after which its first side 154 is bent at right angles to its second side 156 to form the clip 56 best seen in FIG. 22. Thus, although its first and second sides 154, 156 could be welded, it is preferred that the clips 56 be formed as described above. It is to be noted that each purlin girt clip 56 is generally symmetrical about a line passing through the center thereof in the plane of its first side 154, to enable any clip 56 to be used interchangeably with any left and right intermediate column 26 and beam 28. In addition, as perhaps best seen in FIGS. 1 and 20, it is preferred that the height of the second side 156 is selected so that any particular purlin girt clip 56 will nest within the upper flanges 52 and lips 54 of its respective purlins 46. This enables any clip 56 to engage the adjacent ends of its respective purlins 46 and hold them in place while they are being secured thereto, despite the pitch of the roof, meaning only one man instead of two are needed to secure the purlins 46 in place. Similarly, as best seen in FIG. 21, the girts 36 may be rested on the second side 156 of the purlin girt clips 56 while they are assembled thereto, eliminating the need for two men to install the girts 36.

Although it should be clear from the foregoing how the steel frames 14, 16 and the steel frame building 10 is assembled from its component parts, a description of these operations will now be given, with the understanding that many other equally workable methods could be used, depending on the preference and skills of the operators assembling and erecting the same.

First an intermediate frame 16 is assembled while it is lying on the concrete pad 12. Assembly of an intermediate frame 16 is initiated by sandwiching and securing between the webs 66 of the two lengths of said steel stock comprising each left and right intermediate column 26 the left and right intermediate haunch plates 72 and the first sides 154 of all of the purlin girt clips 56 associated with said columns 26 by use of nuts and bolts. The second sides 84 of the intermediate haunch plate stiffener angles 74 are secured with a plurality of nuts and bolts to their respective haunch plates 72. Then the lower extensions 86 of the haunch plate stiffener angles 74 are secured with a plurality of nuts and bolts to their respective interior flanges 68 of the columns 26.

Then the intermediate ridge plate 90 is secured between the webs 66 of its intermediate beams 28 with nuts and bolts.

The four intermediate ridge plate stiffener angles 92 are secured to the ridge plate 90 with nuts and bolts, and the extensions 104 of the angles are secured to their respective interior and exterior flanges 68 of the intermediate beams 28 with nuts and bolts. Then the intermediate haunch plates 72 and all of the purlin girt clips 56 associated with that frame 16's left and right beams 28 are sandwiched and secured between the webs 66 of the two lengths of said steel stock comprising said left and right beams 28 by the use of nuts and bolts. Finally, the upper extensions 86 of the haunch plate stiffener angles 74 are secured to their respective interior flanges 68 of the intermediate columns and beams 26, 28 with nuts and bolts.

The completed intermediate frame 16 is then erected in its proper place on the pad 12, as by a small crane, and the base of each of its columns 28 are secured to anchor bolts 81 in the pad 12 as has been described previously. Guy cables are then secured to the erected frame 16, after it has been squared and plumbed, to stabilize it in place while the next adjacent intermediate frame 16 is likewise assembled, erected, squared, plumbed and held in place by any appropriate means while the purlins 46, eave girts 48 and girts 36 which extend between the two erected intermediate frames 16 are secured between their respective purlin girt clips 56 in the manner previously described. Subsequently, the remaining intermediate frames 16, if more than two are used, are similarly assembled, erected, squared, plumbed, held in place, and connected to the adjacent intermediate frames 16 by their respective purlins 46, eave girts 48 and girts 36.

Next, one end wall frame 14 is assembled on the ground by first securing its left and right end wall haunch plates 72 to its left and right end wall columns 18 with nuts and bolts. One end wall haunch plate stiffener angle 74 is secured to each haunch plate 72 and to the interior flange 68 of its respective end wall column 18 by nuts and bolts. All the corner girt clips 34 associated with the end wall frame 14 are secured to the webs 66 of their respective left and right end wall columns 18 with nuts and bolts.

Next, the left and right end wall beams 20 are secured to the end wall ridge plate 90 with nuts and bolts. The pair of end wall ridge plate stiffener angles 92 are secured to the ridge plate 90 with nuts and bolts while their extensions 104 are secured to their respective interior and exterior flanges 68 on the end wall beams 20 with nuts and bolts. The rake purlin angles 44 are secured to the end wall beams 20 as has been previously described. Finally, the assembly of the end wall frame 14 is completed by securing the tops of its left and right haunch plates 72 to its left and right beams 20 with nuts and bolts, and by securing the upper extensions 86 of the haunch plate stiffener angles 74 to their respective interior flanges 68 with nuts and bolts.

The assembled end wall frame 14 is then erected in its appropriate place on the pad 12, as by a small crane, and the base of each of its columns 18 are secured to anchor bolts 81 in the pad 12, as has been described previously.

The frame 14 is then squared, plumbed and held in place while the purlins 46, eave girts 48 and girts 36 extending between it and the adjacent intermediate frame 16 are secured to their respective purlin girt clips 56, rake purlin angles 44 and corner girt clips 34.

The other end wall frame 14 is then similarly assembled, erected, held in place, squared, plumbed and connected to its adjacent intermediate frame 16 with its respective purlins 46, eave girts 48 and girts 36. Afterwards, the guys which held the first erected intermediate frame 16 upright are removed.

Now that the frames 14, 16 are in place, the remaining items such as the end wall center columns 112, end wall girts 36, doors, windows, the siding and the roofing of the building 10 can be installed.

One of the important features of the present invention is that it is possible to incrementally vary the height and/or width of the steel frame building 10 within a predetermined range of building sizes without any change in the end wall and intermediate haunch and ridge assemblies 22, 24, 30, 32; and without any change in the corner girt clips 34, rake purlin angles 44, purlin girt clips 56, purlins 46, eave girts 48 and girts 36. The only structural members in the end wall and intermediate frames 14, 16 which change are end wall and intermediate columns 18, 26 and beams 20, 28. And even then, because these members are non-tapered, only their length and/or gauge change, the dimensions of their webs 66, flanges 68 and lips 70 remaining constant.

By way of non-limiting example, it has been found possible to design the end wall and intermediate frames 14, 16 in such a way that the building 10 is usable and can have a height above the pad 12 to the eaves which varies from 10 feet to 20 feet and a width which varies from 20 feet to 40 feet; while having a peaked roof with a 2/12 pitch.

As has been discussed earlier, the heaviest stress on the frames 14, 16 occurs when they are utilized in a building 10 having the shortest height and greatest width which stress they are designed to safely withstand. In the example being used, that would be a building 10 having a height of 10 feet and a width of 40 feet. Thus it will be appreciated that, if all the components comprising each frame 14, 16 are designed to withstand the stress of a building 10 having a height of 10 feet and a width of 40 feet, the frames 14, 16 will also safely withstand the stress of a building 10 having a height anywhere from 10 to 20 feet and/or a width anywhere from 40 to 20 feet.

It is true that some small savings in materials could be achieved through the use of components in the haunch and ridge assemblies 22, 30, 24, 32 which are designed to withstand a lesser amount of stress for buildings 10 having a height greater than 10 feet and/or a width less than 40 feet. However this small savings is dwarfed by the increased cost of manufacturing and maintaining a large inventory of varieties of said assemblies, each designed to withstand the stress for a different sized building 10. Thus, it is preferred that all the components in the haunch and ridge assemblies 22, 30, 24, 32 which are designed to withstand the loading of a 10 foot high, 40 foot wide building 10, also be used in any building 10 which has a height from 10 to 20 feet and/or has a width from 40 to 20 feet. Accordingly it is preferred that the ridge plates 90, haunch plate stiffener angles 74 and the ridge plate stiffener angles 92 be formed from 3/16 inch thick, A36 steel. The ridge plates 90 and ridge plate stiffener angles 92 are dimensioned as shown in the figures; the ridge plates 90 being generally twelve inches tall and twelve inches wide. The first sides 100 of the stiffener angles 92, including the extensions 104 are 3 inches wide and about 15 inches long, each extension 104 being about 4 inches long. Their second sides 102 are 2 inches wide and have a maximum length of about 6 inches. The first sides 82 of the haunch plate stiffener angles, including extensions 86 are about 3 feet, 1½ inches long and 3 inches wide, the extensions 86 being about 3 inches long; while their second sides 84 are about 2 feet, 1½ inches long and 1¾ inches wide.

The haunch plates 72 are dimensioned as illustrated, being of generally trapezoidal form and made from ¼ inch thick, A36 steel. The haunch plates 72 are about 3 feet tall, have a first side perpendicular to its lower side, have a minimum width at its lower end of about 10 inches, and have a second side which, if extended, make about a 60° interior angle with said first side.

All of the lengths of said steel stock used to form the columns 18, 26 and beams 20, 28 are made from high tensile strength steel having at least a 50,000 pound yield; and have a 10 inch web 66, 3 inch flanges 68 and ½ inch lips 70. In 40 and 35 foot wide buildings they are 10 gauge; in a 30 foot wide building they are 12 gauge; and in 20 and 25 foot buildings they are 14 gauge; regardless of the height of the building 10, which may vary from 10 to 20 feet. It should be noted that although the length and gauge of the columns 18, 26 and beams 20, 28 will change according to the size of the building 10, it is preferred that the dimensions of their webs 66, flanges 68 and lips 70 do not change.

All of the purlins 46 are of 14 gauge, high tensile strength steel having a 50,000 pound yield, and have an 8 inch web 50, 3 inch flanges 52 and ½ inch lips 54 at an interior angle of 135° with respect to the flanges 52. All of the girts 36, eave girts 48, and center columns 122 are made of 16 gauge 50,000 pound yield, high tensile strength steel, and have an 8 inch web 50, 3 inch flanges 52, and ½ inch lips 54. Since the spacing between the webs of adjacent frames 14, 16 is preferably 20 feet, except for the end bays which are 19 feet, 4 inches long, each purlin 46, eave girt 48 and girt 36 is 20 feet long, except for the girts used across the end walls of the building 10 whose length will vary and depend on the size of the doors, etc. made in the end walls. Since each end bay is 19 feet, 4 inches long, each girt 36, eave girt 48 and purlin 46 extends 8 inches past the webs of the columns 18 and beams 20 in the end wall frames 14.

To the end that any purlin 46, eave girt 48 and girt 36 may be used anywhere in the building 10, the ends of each of these elements have the following pattern of 4, ⅝ inch holes made therein. The center of each hole is 2 inches from the centerline of the element's web, the centers of two of the holes are 1½ inches from the end and the centers of the other two holes are 6 inches from the end.

All of the purlin girt clips 56, rake purlin angles 44 and corner girt clips 34 are made from 3/16 inch thick A36 steel. Each purlin girt clip has a first side 154 having a 9½ inch length and a 2½ width; and a second side 156 having a maximum length of 7¾ inches, a minimum length of 6¼ inches, a maximum width of 5 inches and a minimum width of 2½ inches. Its second side 156 has four ⅝ inch holes 158 the center of each being spaced 2 inches from the second side's centerline. The centers of two of the holes 158 are 1¾ inches from its top end, while the centers of the other two holes 158 are 5¾ inches from its top end. The first side 154 has two 5/8 inch holes located as shown in the figures.

The first sides 140 of the rake purlin angles 44 are 2 inches wide and 15½ inches long while their second sides 142 are 3 inches wide and 15½ inches long. The eight holes in each angle 44 are located as shown. In each's first side 140 two holes are located 7 inches from its centerline. In each's second side 142, two holes are located 2 inches from its centerline while the other two are located six inches from its centerline.

Each corner girt clip 34 is also 15½ inches long, has a first side 126, 2 inches wide, and a second side 128, 3 inches wide. The four mounting holes 130 in the first side are each ⅜ inch in diameter. The centers of two of the holes 130 are spaced 3 inches from the transverse centerline of the clip 34 while the centers of the other two holes are 7 inches from said centerline. As seen in the figures, the two holes 132 in its second side 128 are ⅜ inches in diameter, the centers of which are each 6 inches from said centerline, and are 2 inches from the bend in the clip 34. The two elongated holes 134 in the second side each have a miximum width of ⅜ inches and a length of 1 inch. The center of each elongated hole 134 is 1¾ inches from said centerline and is 2 inches from the bend in the clip 34.

The necessity for the elongated holes 134 stems from the fact that the ends of many commercially available girts 36 are pre-punched with the pattern of four holes previously described, in which two of said four holes are only 1½ inches from the end of the girt while all four holes are spaced 2 inches from the sides of the girt. As a result, as best seen in FIG. 12, at the left corner of each end wall as viewed from the outside, the bolts 138 holding the girts 36 to the corner girt clip 34 will lie towards the left edge of the elongated holes 134. Similarly, although not illustrated, at the right corner of each end wall, the bolts 138 will lie towards the right edge of the elongated holes 134. As a result, it will be appreciated that by constructing each corner girt clip 34 as illustrated, and as described by all the foregoing, there is no necessity to have left and right corner girt clips since any clip 34 can be used at any corner of the building 10 despite the unevenly located mounting holes punched in the ends of most commercially available girts 36.

From the foregoing, various further applications, modifications, and adaptations of the devices disclosed by the foregoing preferred embodiments of the present invention will be apparent to those skilled in the art to which the present invention is addressed, within the scope of the following claims.

I claim:

1. A structural connecting and reinforcing assembly adapted to connect, reinforce, and transfer stress between structural steel members made from lengths of non-tapered, stiffened, C-channel steel stock, each said length having a web, interior and exterior flanges at right angles to said web, and a pair of lips at right angles to said flanges, said structural steel members being used for the left and right columns and the left and right beams in the frames of a steel frame building having a peaked roof, wherein said connecting and reinforcing assembly comprises:

a. a steel plate defining a plurality of mounting holes wherein said plate is adapted to be secured to the adjacent end portions of two of said structural steel members with a plurality of fastening means passing through said mounting holes, and wherein said steel plate is adapted to connect, reinforce, and transfer loading between said two structural steel members; and b. a at least one stiffener angle member adapted to stiffen and reinforce said steel plate, and adapted to connect, reinforce and transfer stress between the adjacent end portions of said two structural steel members, wherein each said stiffener angle member has first and second sides disposed at right angles with respect to each other, said first side has extensions which extend beyond the ends of said second side, said extensions are disposed at angles with respect to said first side, and said second side and said extensions define a plurality of mounting holes adapted to receive therethrough a plurality of fastening means for securing said second side to said steel plate and for securing said extensions to respective adjacent end portions of said two structural steel members;

whereby said connecting and reinforcing assembly eliminates the need for said two structural steel members to have complementary angle cut adjacent ends which are structurally joined together by welding, and also eliminates the need for said two structural steel members to be tapered.

2. The assembly according to claim 1, wherein said two structural steel members comprise one column and one beam, and said steel plate and said extensions are adapted to be secured to the top portion of said one column and to the eave portion of said one beam.

3. The assembly according to claim 2, wherein said one column and one beam each comprise one length of said C-channel steel stock, said steel plate is adapted to be secured to the webs of the adjacent end portions of said one column and said one beam, and said extensions are adapted to be secured to the respective interior flanges of the adjacent end portions of said one column and said one beam.

4. The assembly according to claim 2, wherein there are two stiffener angle members, said one column and said one beam each comprise two lengths of said C-channel steel stock having their webs fastened together with fastener means, said steel plate is adapted to be secured and sandwiched between the webs of the adjacent end portions of said one column and said one beam, said two stiffener angle members are adapted to be secured to opposite sides of said steel plate, and the extensions of said two stiffener angle members are adapted to be secured to respective interior flanges of said one column and said one beam located at the adjacent end portions of said one column and said one beam.

5. The assembly according to claims 3 or 4 wherein said steel plate is adapted to be used with any of said left and right columns and beams; and wherein any stiffener angle member is symmetrical about a transverse line passing through about the center thereof to enable any stiffener angle member to be used with any of said left and right columns and beams.

6. The assembly according to claim 1, wherein there are a pair of said stiffener angle members, said two structural steel members comprise two beams, and said steel plate and the extensions of both of said stiffener angle members are adapted to be secured to adajcent end portions of said two beams at about the ridge line of said peaked roof.

7. The assembly according to claim 6, wherein said two beams each comprise one length of said C-channel steel stock, said steel plate is adapted to be secured to the webs of the adjacent end portions of said beams, the extensions of one of said pair of stiffener angle members are adapted to be secured to the interior flanges of the adjacent end portions of said two beams, and the extensions of the other of said pair of stiffener angle members are adapted to be secured to the exterior flanges of the adjacent end portions of said two beams.

8. The assembly according to claim 6, wherein there are two pairs of said stiffener angle members, said two beams each comprise two lengths of said C-channel steel stock having their webs fastened together with fastener means, said steel plate is adapted to be secured and sandwiched between said webs located at the adjacent end portions of said two beams, said two pairs of stiffener angle members are adapted to be secured to opposite sides of said steel plate, the extensions of two of said stiffener angle members are adapted to be secured to respective interior flanges of said two beams located at the adjacent end portions of said two beams, and the extensions of the other two of said stiffener angle members are adapted to be secured to respective exterior flanges of said two beams located at the adjacent end portions of said two beams.

9. The assembly according to claims 7 or 8 wherein each said stiffener angle member is symmetrical about a line passing transversely through about the center thereof, to permit any particular stiffener angle member to be used on any side of said steel plate, and said stiffener angle members are identical to enable each said stiffener angle member to be secured to both the interior and the exterior flanges of said adjacent end portions of the beams.

10. A frame for a steel frame building having a peaked roof, said frame comprising:
left and right columns and left and right beams each comprising a length of non-tapered, C-channel steel stock having a web, interior and exterior flanges at right angles to said web, and a pair of inwardly extending lips at right angles to said flanges;
left and right steel plates secured with a plurality of fastener means to respective top portions of said left and right columns and to respective eave end portions of said left and right beams, said steel plates connecting, reinforcing and transferring stress between their respective columns and beams;
a ridge steel plate secured with a plurality of fasteners to the roof ridge portions of said left and right beams, said ridge steel plate connecting, reinforcing, and transferring loading between its respective beams;
left, right, and a pair of ridge stiffener angle members for stiffening and reinforcing said left, right, and ridge steel plates, respectively, and for transferring stress between the respective columns and beams secured to said left, right, and ridge steel plates, said stiffener angle members each having first and second sides disposed at generally right angles with respect to each other, said first side having extensions which extend beyond the ends of said second side and which are disposed at angles with respect to said first side, said second side being secured with a plurality of fastener means to its respective steel plate, said extensions of said left and right stiffener angle members being secured with fastener means to their respective columns and beams which are secured to their respective said left and right steel plates, and the extensions of said pair of ridge stiffener angle members being secured with fastener means to their respective beams which are secured to said ridge steel plate;
whereby said steel plates and said stiffener angle members eliminate the need for said columns and beams to have complementary angle cut adjacent ends which are structurally joined together by welding, and also eliminate the need for said columns and beams to be tapered.

11. A frame according to claim 10, said frame being an end wall frame for said steel frame building, wherein said columns and beams each comprise one length of said steel stock, said left, right and ridge steel plates are secured to the webs of their respective columns and beams, the extensions of said left and right stiffener angle members are secured to their respective interior flanges of the columns and beams which are secured to their respective said left and right steel plates, the extensions of one of said ridge stiffener angle members are secured to their respective interior flanges of said beams which are secured to said ridge steel plate, and the extensions of the other of said ridge stiffener angle members are secured to their respective exterior flanges of said beams which are secured to said ridge steel plate.

12. The frame according to claim 11, further comprising at least one corner girt clip adapted to be used to secure a pair of girts comprising one side wall girt and one end wall girt to one of said left and right columns of said end wall frame, wherein said side wall girt and said end wall girt are of the type having their ends each prepunched with a pattern of four girt holes; wherein the spacing of said four girt holes is unequal, in that the distance between the end of their respective girt and the two of said girt holes closest to said end is not the same as the distance between the sides of their said respective girt and said four holes as measured between each of said four holes and the side of their said respective girt which is closest to said each of said four holes; wherein said corner girt clip is adapted to hold the end of one of said pair of girts adjacent to the side of the other of said pair of girts; wherein said corner girt clip comprises first and second corner girt clip sides at right angles with respect to each other; wherein said first corner girt clip side is secured to its respective column and said second corner girt clip side defines a plurality of mounting holes adapted to receive therethrough a plurality of fasteners for securing said second corner girt clip side to said pair of girts; wherein said corner girt clip is generally symmetrical about a centerline passing transversely through about the center thereof; wherein there are four of said mounting holes defined by said second corner girt clip side; and wherein the two of said four mounting holes which are closest to and on opposite sides of said centerline are elongated, to eliminate the need to have different corner girt clips for said left and right columns despite the spacing of said four girt holes being unequal.

13. The frame according to claim 11, further comprising at least one rake purlin angle adapted to be used to secure purlins to said beams of said end wall frame, wherein said rake purlin angle comprises first and second rake purlin angle sides at generally right angles with respect to each other; wherein said first rake purlin angle side is secured to the web of a respective said beam; wherein said second rake purlin angle side defines a plurality of mounting holes adapted to receive therethrough a plurality of fastener means for securing said second rake purlin angle side to the purlin web of one purlin having a purlin web, upper and lower purlin flanges at right angles with respect to and on opposite sides of said purlin web, and upper and lower purlin lips making less than a 180 degree interior angle with respect to their respective upper and lower purlin flanges; wherein said rake purlin angle is generally symmetrical about a line passing transversely through about the center thereof, to enable any particular rake purlin angle to be used at any of said left and right beams, thereby eliminating the need to have different rake purlin angles for said left and right beams; and wherein said rake purlin angle is sized and its said mounting holes are located so as to enable the upper end of said rake purlin angle, when installed, to be adapted to nest within the space defined by said purlin web, upper purlin flange and upper purlin lip, and to accordingly engage and hold said purlin in place while said purlin is being secured to said rake purlin angle with said fastener means.

14. A frame according to claim 10, said frame being a frame located between the ends of said steel frame building, wherein there are one pair of each of said left and right stiffener angle members and two pairs of said ridge stiffener angle members, said columns and beams each comprise two lengths of said steel stock having their webs secured together with a plurality of fasteners, said left, right, and ridge steel plates are secured and sandwiched between the webs of their respective columns and beams, said pairs of left, right and ridge stiffener angle members are secured to the opposite sides of their respective left, right and ridge steel plates, said extensions of said pairs of left and right stiffener angle members are secured to their respective interior flanges of the columns and beams which are secured to their respective said left and right steel plates, the extensions of two of said ridge stiffener angle members are secured to their respective interior flanges of said beams which are secured to said ridge steel plate, and the extensions of the other two of said ridge stiffener angle members are secured to their respective exterior flanges of said beams which are secured to said ridge steel plate.

15. The frame according to claims 11 or 14 wherein said left and right steel plates can be used interchangeably, said left and right stiffener angle members are symmetrical about a line passing transversely through about the center thereof to enable said left and right stiffener angle members to be used interchangeably, said ridge stiffener angle members are symmetrical about a line passing transversely through about the center thereof to enable said stiffener angle members to be used on any side of said ridge plate, and said ridge stiffener angle members are identical to enable any said stiffener angle member to be secured to both the interior and exterior flanges of said beams.

16. The frame according to claim 14, further comprising at least one purlin girt clip adapted to be used to secure purlins and girts to at least one of said left and right beams and said left and right columns, respectively; wherein each said purlin girt clip is generally T-shaped and comprises first and second purlin girt clip sides lying in planes at right angles with respect to each other, with said first purlin girt clip side forming the stem of said T and said second purlin girt clip side forming the top of said T; wherein said first and second purlin girt clip sides each define a plurality of mounting holes; wherein said first purlin girt clip side is secured and sandwiched between the webs of at least one of said columns and beams at right angles with respect thereto with a plurality of fasteners passing through said mounting holes in said first purlin girt clip side, in a position such that said second purlin girt clip side extends outwardly from said at least one of said columns and beams; wherein said second purlin girt clip side is adapted to be secured to the ends of two of said purlins and girts with a plurality of fasteners passing through said mounting holes in said second purlin girt clip side; and wherein said purlin girt clip is generally symmetrical about its longitudinal centerline to enable said purlin girt clip to be adapted to be used with any of said left and right columns and beams, thereby eliminating the need to have different purlin girt clips for said left and right columns and beams.

17. The frame according to claim 16 wherein said purlin girt clip is made from one piece of sheet metal stock wherein said first purlin girt clip side is bent at right angles with respect to said second purlin girt clip side.

18. The frame according to claim 16, wherein said purlin girt clip is made according to the method of:
   obtaining a generally L-shaped piece of sheet metal from a sheet of sheet metal stock, wherein the stem and the bottom of the L are coplanar;
   cutting said L-shaped piece of sheet metal for a distance approximately equal to the width of said first purlin girt clip side, at a location spaced from one end of said L-shaped piece of sheet metal a distance approximately equal to the length of said first purlin girt clip side; and
   bending the stem and bottom of said L-shaped piece of sheet metal until said portions are at approximately right angles with respect to each other to form a generally T-shaped article, wherein the stem of said T forms said first purlin girt clip side and the top of said T forms said second purlin girt clip side; and
   forming a plurality of mounting holes in each of said first and second purlin girt clip sides.

19. A corner girt clip adapted to be used to secure a pair of girts comprising one side wall girt and one end wall girt to one of the left and right columns of an end wall frame of a steel frame building, wherein said side wall girt and said end wall girt are of the type having their ends each prepunched with a pattern of four girt holes; wherein the spacing of said four girt holes is unequal, in that the distance between the end of their respective girt and the two of said girt holes closest to said end is not the same as the distance between the sides of their said respective girt and said four holes as measured between each of said four holes and the side of their said respective girt which is closest to said each of said four holes; wherein said corner girt clip is adapted to hold the end of one of said pair of girts adjacent to the side of the other of said pair of girts; wherein said corner girt clip comprises first and second corner girt clip sides at right angles with respect to each other; wherein said first and second corner girt clip sides each define a plurality of mounting holes adapted to receive therethrough a plurality of fasteners for securing said first corner girt clip side to its respective column, and for securing said second corner girt clip side to said pair of girts; wherein said corner girt clip is generally symmetrical about a centerline passing transversely through about the center thereof; wherein there are four of said mounting holes defined by said second corner girt clip side; and wherein the two of said four mounting holes which are closest to and on opposite sides of said centerline are elongated, to eliminate the need to have different corner girt clips for said left and right columns, despite the spacing of said four girt holes being unequal.

20. A rake purlin angle adapted to be used to secure purlins to the rafters of an end wall frame of a steel frame building having left and right rafters, wherein said rake purlin angle comprises first and second rake purlin angle sides at generally right angles with respect to each other; wherein said first and second rake purlin angle sides each define a plurality of mounting holes adapted to receive therethrough a plurality of fastener means for securing said first rake purlin angle side to its respective rafter and for securing said second rake purlin angle side to one purlin having a purlin web, upper and lower purlin flanges at right angles with respect to and on opposite sides of said purlin web, and upper and lower purlin lips making less than a 180 degree interior angle with respect to their respective upper and lower purlin flanges; wherein said rake purlin angle is generally symmetrical about a line passing transversely through about the center thereof, to enable any particular rake purlin angle to be used at any of said left and right rafters, thereby eliminating the need to have different rake purlin angles for said left and right rafters; and wherein said rake purlin angle is sized and its said mounting holes are located so as to enable the upper end of said rake purlin angle, when installed, to be adapted to nest within the space defined by said purlin web, upper purlin flange and upper purlin lip, and to accordingly engage and hold said purlin in place while said purlin is being secured to said rake purlin angle with said fastener means.

21. A purlin girt clip adapted to be used to secure purlins and girts to the left and right beams and to the left and right columns, respectively, of a frame located between the end walls of a steel frame building, wherein each said column and beam comprises two lengths of C-channel stock having their webs secured together with a plurality of fasteners; wherein each said purlin girt clip is generally T-shaped and comprises first and second purlin girt clip sides lying in planes at right angles with respect to each other, with said first purlin girt clip side forming the stem of said T and said second purlin girt clip side forming the top of said T; wherein said first and second purlin girt clip sides each define a plurality of mounting holes; wherein said first purlin girt clip side is adapted to be secured and sandwiched between the webs of at least one of said columns and beams at generally right angles with respeact thereto with a plurality of fasteners passing through said mounting holes in said first purlin girt clip side, and said first purlin girt clip side is adapted to be secured in such a position such that said second purlin girt clip side extends outwardly from said at least one of said columns and beams in a plane which is generally perpendicular with respect to said at least one of said columns and beams; wherein said first and second girt clip sides have an area of intersection lying in the plane of said first purlin girt clip side; wherein said second purlin girt clip side is adapted to be secured to the ends of two of said purlins and girts with a plurality of fasteners passing through said mounting holes in said second purlin girt clip side; and wherein said purlin girt clip is generally symmetrical about its longitudinal centerline to enable said purlin girt clip to be adapted to be used with any of said columns and beams, thereby eliminating the need to have different purlin girt clips for said left and right columns and beams.

22. The purlin girt clip according to claim 21, wherein each said purlin girt clip is made from one piece of sheet metal stock, and said first and second purlin girt clip sides are bent with respect to each other such that the planes of said first and second purlin girt clip sides are at right angles with respect to each other.

23. The purlin girt clip according to claim 21, wherein said purlin girt clip is made according to the method of:
obtaining a generally L-shaped piece of sheet metal from a sheet of sheet metal stock, wherein the stem and the bottom of the L are coplanar;
cutting said L-shaped piece of sheet metal for a distance approximately equal to the width of said first purlin girt clip side, at a location spaced from one end of said L-shaped piece of sheet metal a distance approximately equal to the length of said first purlin girt clip side; and
bending the stem and bottom of said L-shaped piece of sheet metal until said portions are at approximately right angles with respect to each other to form a generally T-shaped article, wherein the stem of said T forms said first purlin girt clip side and the top of said T forms said second purlin girt clip side; and
forming a plurality of mounting holes in each of said first and second purlin girt clip sides.

24. A method of providing the frames for a steel frame, peaked roof building whose width and height can be incrementally varied, wherein said building is of the type comprising a plurality of spaced apart frames which support the roofing and siding of the building, each frame comprising:
left and right columns supporting left and right beams, each said column and each said beam comprising at least one length of non-tapered, stiffened C-channel steel stock;
left and right haunch plates secured with fastener means to the eave ends of said left and right columns and beams, said haunch plates connecting, reinforcing and transferring stress between the respective columns and beams;
left and right haunch plate stiffener angle members, each stiffener angle member having first and second stiffener angle sides at right angles, said first side having extensions which extend beyond the ends of said second side and which are disposed at angles with respect to said first side, said second side being secured with a plurality of fasteners to its respective haunch plate, said extensions being secured with a plurality of fastener means to their respective interior flanges of the respective column and beam which are secured to their respective haunch plate, said stiffener angle members serving to stiffen and reinforce their respective haunch plates and to transfer stress between their respective columns and beams;
a ridge plate secured with fastener means to the ridge ends of said beams for connecting, reinforcing and transferring stress between its respective beams; and
interior and exterior ridge plate stiffener angle members, each ridge plate stiffener angle member having first and second ridge plate stiffener angle sides at right angles, said first ridge plate stiffener angle side having extensions which extend beyond the ends of said second ridge plate stiffener angle side and which are disposed at angles with respect to said first ridge plate stiffener angle side, said second ridge plate stiffener angle side being secured with a plurality of fasteners to said ridge plate, said extensions of said interior ridge plate stiffener angle member being secured with a plurality of fastener means to their respective interior flanges of the beams which are secured to said ridge plate, said extensions of said exterior ridge plate stiffener angle member being secured with a plurality of fastener means to their respective exterior flanges of the beams which are secured to said ridge plate, said interior and exterior ridge plate stiffener angle members serving to stiffen and reinforce said ridge plate and to transfer stress between the beams secured to said ridge plate; wherein the method comprises the steps of:

designing said columns, beams, haunch plates, ridge plates, haunch plate stiffener angles, and ridge plate stiffener angles comprising said frames to safely withstand the stress of a first steel frame building; and providing a second steel frame building having at least one of a greater height and a lesser width as compared to said first steel frame building by the steps of:

leaving unchanged the stress design of said haunch plates, ridge plates, haunch plate stiffener angles, and ridge plate stiffener angles:

incrementally changing at least one of the length and the gauge of said C-channel steel stock comprising said columns and beams; and leaving unchanged the other dimensions of said C-channel steel stock comprising said columns and beams.

* * * * *